United States Patent [19]
LaPlante et al.

[11] Patent Number: 5,233,624
[45] Date of Patent: Aug. 3, 1993

[54] METHOD AND APPARATUS FOR AN INCREASED OUTPUT FOR A PUMPED LASER USING A MOVING APERTURE

[75] Inventors: Mark J. LaPlante, Walden, N.Y.; Howard A. Bender, III, Oviedo, Fla.; William D. Carbaugh, Jr., Marlboro, N.Y.; David C. Long; Christopher D. Setzer, both of Wappingers Falls, N.Y.

[73] Assignee: International Business Machines Corporation, Armonk, N.Y.

[21] Appl. No.: 954,523

[22] Filed: Sep. 30, 1992

[51] Int. Cl.$^5$ ............................................. H01S 3/08
[52] U.S. Cl. ......................................... 372/98; 372/69
[58] Field of Search ................... 372/15, 16, 98, 99, 372/100, 103, 108, 69

[56] References Cited

U.S. PATENT DOCUMENTS

| | | | |
|---|---|---|---|
| 3,699,474 | 10/1972 | Landry | 372/16 |
| 4,637,028 | 1/1987 | Kahan | 372/98 |
| 4,922,502 | 5/1990 | Unternahrer et al. | 372/15 |
| 5,033,058 | 7/1991 | Cabaret et al. | 372/99 |

FOREIGN PATENT DOCUMENTS

| | | |
|---|---|---|
| 2932204 | 8/1979 | Fed. Rep. of Germany . |
| 61-20381 | 1/1986 | Japan . |
| 0267783 | 3/1990 | Japan . |

OTHER PUBLICATIONS

Hecht, Jeff, "Understanding Lasers An Entry-Level Guide", IEEE, pp. 165-166 (1992).

*Primary Examiner*—John D. Lee
*Assistant Examiner*—Robert E. Wise
*Attorney, Agent, or Firm*—Aziz M. Ahsan

[57] ABSTRACT

A solid state lasing medium is pumped to produce a high repetition rate laser beam. The laser medium is pumped to cause maximum population inversion. The laser medium is greater in diameter than the aperture that defines the allowable beam path. In the preferred embodiment the off-axis laser beam that is produced is steered to become an on-axis laser beam using a novel SBSA (spinning beam steering assembly). The output of the laser is increased because as the SBSA spins, the area of the lasing medium that is not lasing is being charged or pumped. The laser medium can also be hollow to allow for pumping from either outside or inside the hollow bore or both. Similarly, this hollow bore in the laser medium could also allow cooling fluids to be circulated therethrough. Different embodiments of the SBSA are disclosed, including a variety of methods to pump the laser medium. Also, disclosed is a novel field removable or replaceable laser medium housing assembly.

74 Claims, 8 Drawing Sheets

METHOD AND APPARATUS FOR AN INCREASED OUTPUT FOR A PUMPED LASER USING A MOVING APERTURE

CROSS-REFERENCE TO RELATED APPLICATION

This Patent Application relates to U.S. patent application Ser. No. 07/734,499, filed on Jul. 23, 1991, now U.S. Pat. No. 5,172,388, the disclosure of which is incorporated herein by reference.

FIELD OF THE INVENTION

This invention relates generally to method and apparatus for an increased output for a CW (Continuous Wave) pumped laser, and more specifically to method and apparatus for an increased output for a CW pumped Nd:YAG laser using at least one sweeping aperture. The invention also teaches that any CW pumped laser medium can be used to provide the increased output for the CW pumped laser. With the addition of a Q-switch the pulse repetition rate of the laser can also be increased.

BACKGROUND OF THE INVENTION

Various methods and apparatus have been used to efficiently pump lasers and to get the maximum output from the laser pumping media. For example, U.S. Pat. No. 3,311,844 (DiCurcio) disclosed a "high-speed" pulsed laser system. It uses multiple rods that are secured to the periphery of a wheel. The rods are rotated into a laser cavity and pulsed pumped and fired. However, "high-speed" for this system is 1 Hz with very high power. Also embodied in this patent is cooling of the rods by a method of selective indexing. This system also shows that multiple pumping lamps can be used to pulse pump these one or more rods in the pumping chamber. These lamps are flashed in coordination with the passage of the rods through the pumping chamber to deliver pumping energy to the rod in the chamber. In this manner the lamps are fired sequentially to avoid excessive heat build-up in any one lamp. If it is desired to cool each laser rod after the rod has been pulsed, one or more cooling devices such as fans or blowers can be placed around the periphery of the system to deliver a flow of cooling air to cool the laser rods after they have been pulsed.

U.S. Pat. No. 4,567,597 (Mandella) discloses a laser system having a stationary lasing region. The lasing medium is rotated to bring thermally cooled unpumped portions into the lasing cavity and where it is pumped and then allowed to lase, and the lasing media is then rotated out of the lasing cavity so that heat is transferred out of the cylinder to the surroundings. This patent also discloses a laser rod in the shape of a hollow cylinder that is rotated so that the cooled and non-excited region is brought into the resonator cavity, is allowed to lase, the then fired portion of the hollow laser rod is rotated out so that heat is transferred out of the hollow cylinder to the surroundings.

U.S. Pat. No. 4,575,854 (Martin) discloses another unique pumping scheme for Nd:YAG lasers. Instead of using an arc lamp, a bank of laser diode arrays or an array of laser diodes surrounds the cylindrical rod. These laser diode arrays are sequentially pulsed to provide CW pumping, by insuring that at least one diode array is on while the others are off. Each diode array actually operates at quite a low duty-cycle for cooling purposes. The stationary Nd:YAG laser rod is pumped by the surrounding array of diode laser bars, which are electronically fired in rotation.

U.S. Pat. No. 4,845,721 (Hoffmann) discloses a solid state laser rod having internal bores through which a coolant can flow. Hoffmann also discloses rotating the rod so that only specific portions of the laser materials are subjected to pumping while other portions are cooling. This patent also describes means by which solid-state laser media can be cooled through special designs/shapes of the actual material. These designs facilitate laser cooling by increasing surface area for heat extraction. Reference is made to a tubular shaped rod (empty cylinder) which is rotated into the resonator pumping region, however, this is done solely for cooling purposes.

U.S. Pat. No. 4,890,289 (Basu et al.) discloses a rotating disk laser which is optically pumped by a source positioned off center from the axis of rotation of the lasing disk. This patent describes both rotation or translation of the lasing medium for the purpose of thermal load distribution. Reducing the thermal effects caused by lamp pumping is the main purpose of this patent. It incorporates diode-pumping with delivery of that radiation via fiber optics. Additionally, the rotation of the medium is solely for the purpose of reducing thermal stress in the medium.

This invention, however, discloses a spinning beam steering assembly (SBSA) that is spun at high rates of speed on its axis. The SBSA offsets the lasing optical path, and causes the lasing path to be swept through a circular region of the lasing medium. The output laser beam remains stationary on the SBSA's spin axis. The size of the lasing medium should be slightly larger than the size of the circular region swept by the SBSA. While the SBSA is spun, within the laser cavity, the lasing medium is pumped with energy. The off-axis beam of light swept by one or more SBSA is then amplified by the rod and transmitted through at least one end mirror and is then directed to the work-piece.

The spinning beam steering assembly increases the laser repetition rate, because as the SBSA spins, the swept area of the lasing medium that is not releasing energy or photons or not lasing is being charged or pumped with energy or photons, so that each area that lases is fully charged when it is allowed to lase through the SBSA.

Additionally, for the maximum repetition rates of this invention and for repetition rates less than the higher repetition rate of the current invention, all laser pulses will have uniform intensity, because the area swept by the SBSA will be fully pumped or charged (saturated) and ready to lase. This results in uniform pulse intensities through the full range, i.e., from very low repetition rates to the new higher repetition rates for a laser, which is greatly desirable for many laser applications.

PURPOSES AND INVENTION OF THE INVENTION

One purpose of this invention is to provide an increased pulse repetition rate for CW pumped Q-Switched lasers using at least one spinning beam steering assembly (SBSA).

Another purpose of this invention is to provide larger diameter laser media for proportionally higher repetition rates or lower rotational speeds of the SBSA.

Still another purpose of this invention is to utilize the entire volume of the laser medium while maintaining a Gaussian beam profile.

Yet another purpose of this invention is to achieve greater CW laser output with a Gaussian beam profile.

Still another purpose of this invention is to extract the maximum lasing output from the laser media.

Yet another purpose of this invention is to provide means for synchronizing the rotation of two or more SBSA's.

Another purpose of this invention is to provide pressurized fluid bearings for the SBSA's.

In one aspect this invention is an enhanced pumped laser system comprising:

a) at least one laser medium for forming a laser beam, said laser beam having a laser beam axis, b) at least one means for pumping at least a portion of said at least one laser medium, wherein said pumping causes a population inversion in at least a portion of said at least one laser medium, c) at least one means for defining an allowable laser beam path, wherein said allowable laser beam path is smaller than the cross-section of said at least one laser medium, d) at least one means for sweeping said allowable laser beam path through said population inverted region of said at least one laser medium, e) at least one first mirror to reflect at least a portion of said laser beam, f) at least one second mirror, wherein said second mirror is an output coupler mirror to reflect at least a portion of said laser beam, wherein said second mirror is opposite said first mirror, and g) wherein said laser beam passes through said means for defining an allowable laser beam path and at least a portion of said laser beam reflects off a portion of said first and said second mirrors during the sweeping of said population inversion region of said at least one laser medium, thereby forming said enhanced pumped laser system.

In another aspect this invention is a method for an enhanced pumped laser system comprising the steps of:

a) rotating at least one spinning beam steering assembly (SBSA) having an offset axis and a rotational axis, wherein said offset axis is displaced from said rotational axis by at least one radius of a laser beam, b) pumping at least a portion of at least one laser medium, wherein said pumping causes a population inversion in at least a portion of said at least one laser medium, and wherein at least a portion of said laser medium is lasing and forming said laser beam, while at least a portion of a non-lasing portion of said laser medium is being pumped to cause said population inversion, c) having at least one means for defining an allowable laser beam path, wherein said allowable laser beam path is smaller than the cross-section of said at least one laser medium, d) using at least two mirrors to reflect at least a portion of said laser beam, wherein at least one of said mirrors is an output coupler mirror, and e) allowing the passage of said reflected laser beam to pass through said at least one means for defining an allowable laser beam path, and thereby increasing said pulse repetition rate for said pumped laser.

These and other purposes and aspects of the invention will become more apparent after referring to the following description considered in conjunction with the accompanying drawings.

BRIEF DESCRIPTION OF THE DRAWINGS

The features of the invention believed to be novel and the elements characteristic of the invention are set forth with particularity in the appended claims. The figures are for illustration purposes only and are not drawn to scale. Furthermore, like numerals refer to like features in the drawings even though these features may not necessarily have been drawn to scale. The invention itself, however, both as to organization and method of operation, may best be understood by reference to the detailed description which follows, taken in conjunction with the accompanying drawings in which:

DETAILED DESCRIPTION OF THE INVENTION

Figure 1:
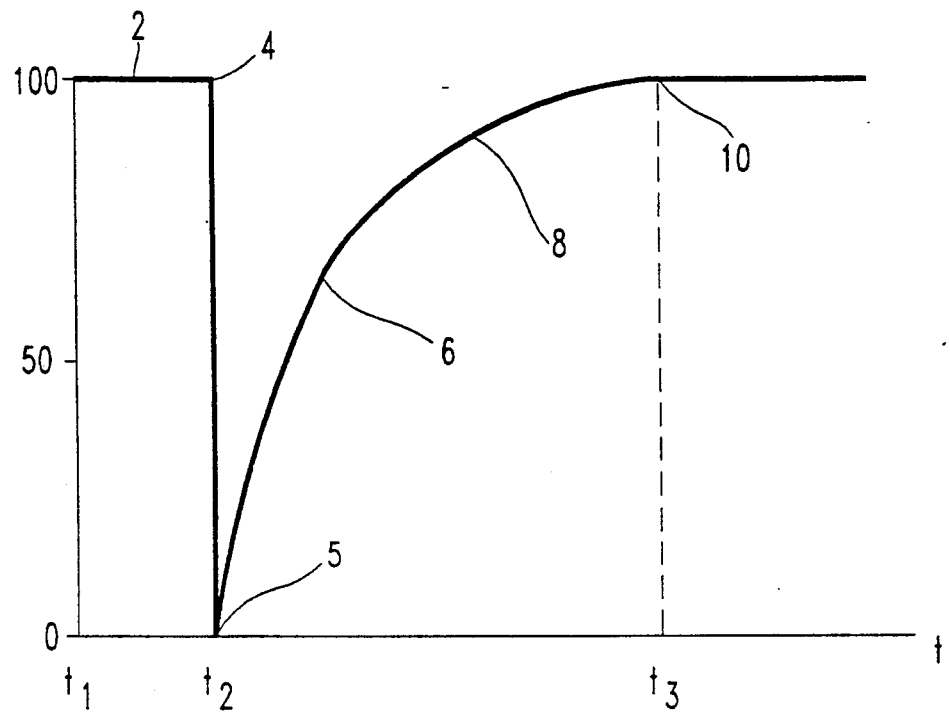
FIG. 1, is a diagram showing a charge and discharge time for a prior art solid state lasing rod.

In an effort to improve the performance of a CW (Continuous Wave) pumped Q-switched Nd:YAG laser, it has become apparent that the maximum repetition rate at maximum peak power occurs at approximately 1 KHz. This is primarily due to the fixed maximum pumping rate of a CW pumped laser medium, such as a laser rod, as shown in FIG. 1, wherein the X-axis shows the pumping time t, and the Y-axis shows the pumping of the laser medium from zero to 100 percent pumping level.

For existing continuously pumped Q-switched solid state lasers, at time $t_1$, prior to the laser pulse at time $t_2$, the laser medium is fully pumped 2, and is at maximum population inversion. At point 4, the laser is fired, depleting the solid state laser medium of the stored energy at 5, at time $t_2$. With constant pumping at a maximum rate, the population inversion is partially restored at point 8, on the pumping curve 6, and is fully pumped 10, at time $t_3$. This whole process from time $t_2$ to time $t_3$, typically takes about 1 millisecond (msec) for a Nd:YAG laser.

In a standard laser system, if the laser is pulsed or fired again before the laser medium has had time to be fully repumped, then the resulting output pulse of light is less intense than that of a pulse from a fully pumped laser medium. This leads to large variations in output energy for randomly pulsed or fired laser mediums, and is very undesirable for most laser applications.

Figure 2A:
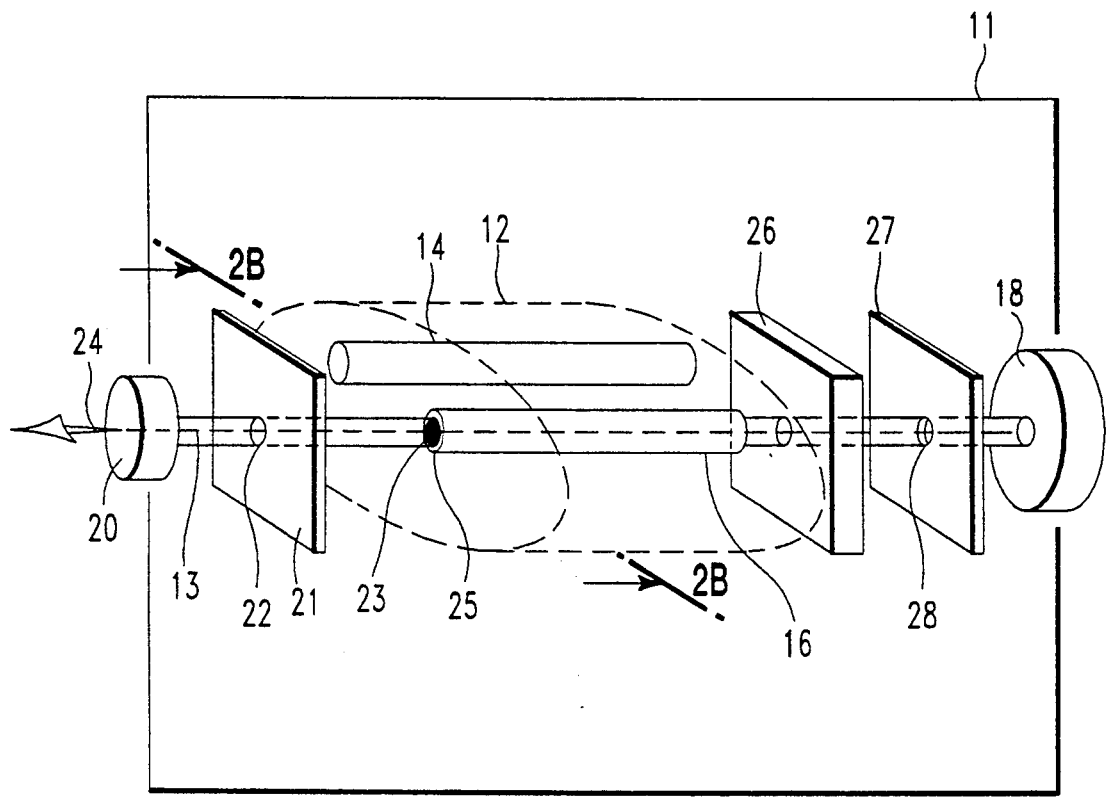
FIG. 2A, illustrates the prior art apparatus and method for lasing a solid state lasing rod in a CW pumped Q-switched laser cavity.
Figure 2B:
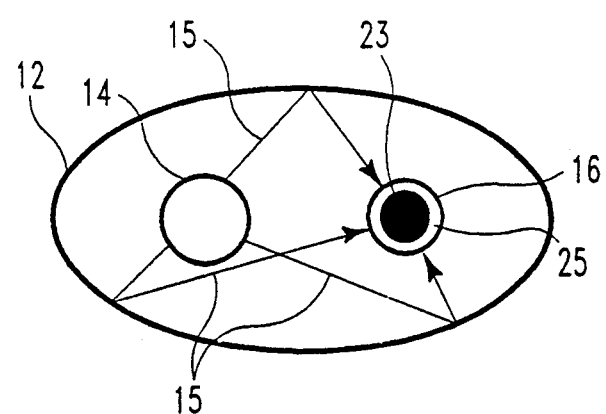
FIG. 2B, is a schematic view taken along section 2B—2B, in FIG. 2A.

A typical prior art solid state Nd:YAG laser cavity 11, is shown in FIGS. 2A and 2B. A reflector 12, which is typically a liquid-cooled elliptical reflector, houses both the optical pumping source 14, such as a CW krypton arc lamp, and the laser medium 16, such as a solid state laser rod 16. The axis 13, is the same optical axis 13, for the laser medium 16, and which is also the same as the laser beam axis. The first or rear mirror 18, which could also be an output coupler mirror, and the second or front mirror 20, which is an output coupler mirror 20, form a laser resonator or optical cavity 11. The position of the mirrors 18 and 20, could be easily interchanged, depending on which side one wants the laser beam 24, to exit. The front aperture 22, in a front plate 21, and the rear aperture 28, in the rear plate 27, provide spatial filtering to define the allowable beam path, in order to produce a Gaussian output beam 24. A Q-switch 26, essentially controls the passage or gates the beam on and off, allowing an output laser beam or pulse to occur when desired.

FIG. 2B, is a sectional view taken along section 2B—2B, in FIG. 2A, showing the reflector 12, with laser rod 16. The krypton arc lamp 14, emits pumping radiation or light rays or photons 15, inside the elliptical reflector 12. These light rays 15, pump the laser rod 16. Upon being sufficiently charged the laser rod 16, emits photons towards the rear mirror 18. The Q-switch 26, which is under electronic control, controls the passage of the laser beam, and upon command, allows the photons to strike the rear mirror 18. After these photons bounce back to the laser rod 16, they are amplified by stimulated emission producing a laser beam 24, which exits through the front aperture 22, and the output coupler mirror 20. Typically, the output coupler mirror 20, only allows about 10 percent of the laser beam 24, to pass through, and it reflects the remaining light back into the laser cavity 11, for further amplification by stimulated emission of photons. The apertures 22 and 28, can be used to define the allowable laser beam diameter. This controlling of the laser beam diameter by the apertures create the active or lasing region 23, and inactive or non-lasing region 25, in the laser rod 16. These apertures 22 and 28, are utilized to insure that the laser produces a Gaussian beam which can be finely focused. In cases where these apertures 22 and 28, are not used, the emitted laser beam may be multimode which cannot be finely focused. The use of the apertures 22 and 28, to achieve a high quality beam will result in a lower power output due to the fact that a smaller portion of the laser rod 16, is allowed to lase.

In standard Nd:YAG laser configurations, to produce a Gaussian beam profile 24, as discussed above, a small diameter solid state laser rod 16, in an elliptical pumping chamber 12, is used along with beam path through the laser rod 16.

The above configuration produces a stable Gaussian mode of limited repetition rate and most efficiently utilizes the pumped volume of the laser rod 16. The same Gaussian beam 24, may, however, be obtained by using a larger diameter rod (normally used in high power multi-mode lasers) with the same apertures, but at a reduced efficiency, due to the unused volume of the pumped rod.

Figure 3A:
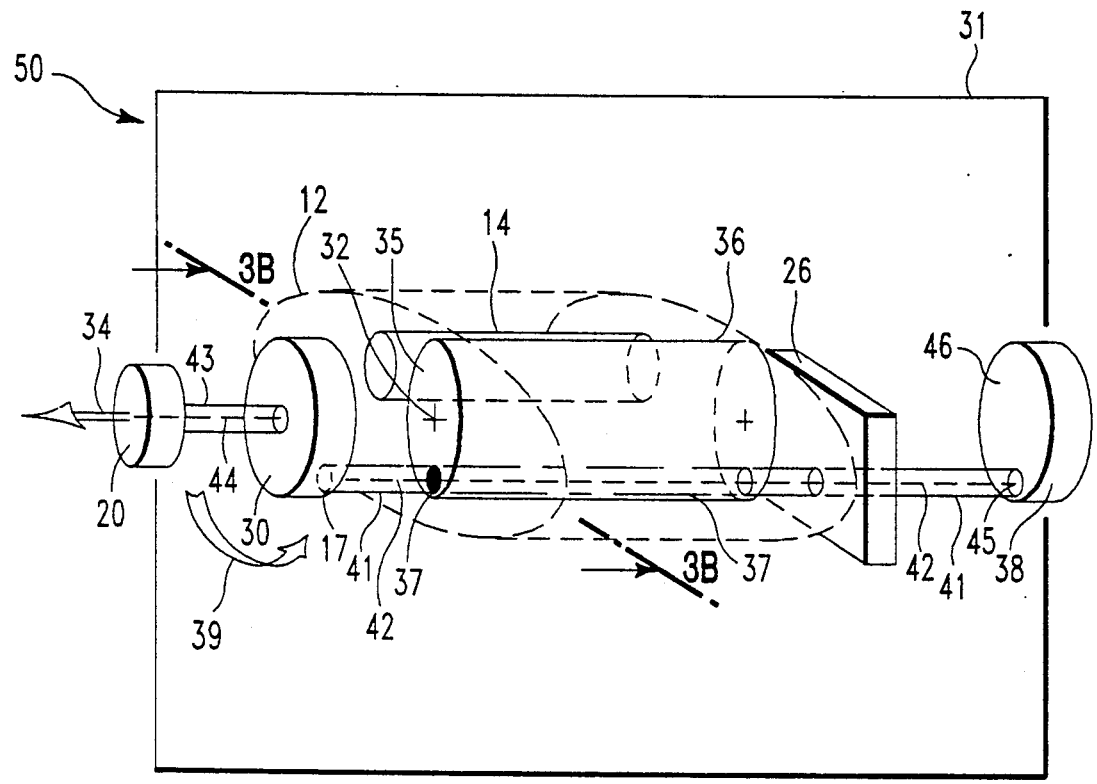
FIG. 3A, illustrates one embodiment of this invention, showing the enhanced laser system.
Figure 3B:
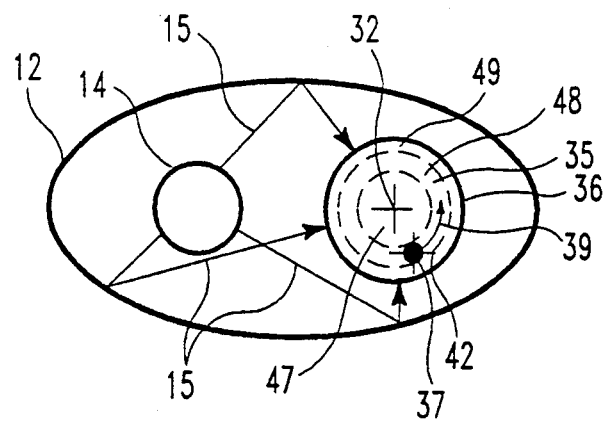
FIG. 3B, is a schematic view taken along section 3B—3B, in FIG. 3A.
Figure 3C:
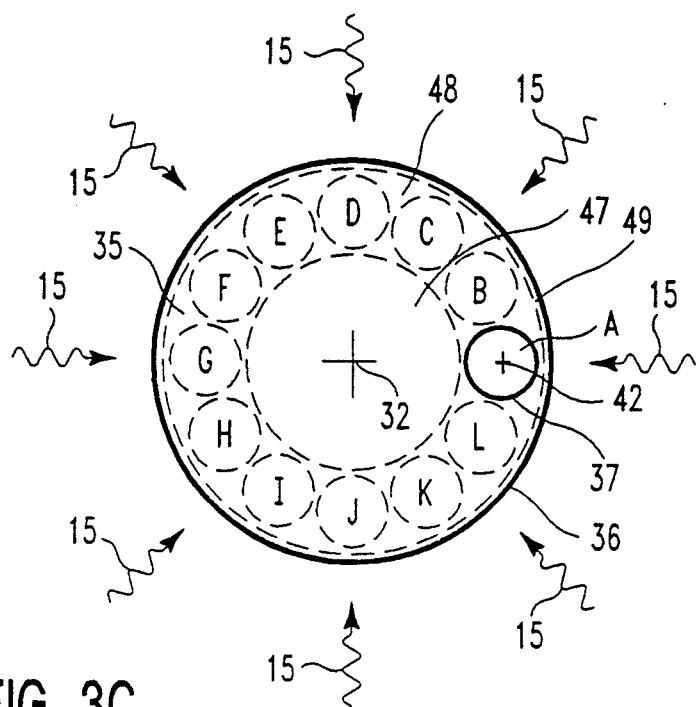
FIG. 3C, shows a process of charging and discharging the laser medium using the SBSA of this invention.

FIGS. 3A, 3B and 3C, illustrate one embodiment of the enhanced pumped laser system 50, of this invention. The various embodiments of this invention have been discussed using a solid state laser rod, but, any pumped lasing medium can be used with this invention, such as, a CW pumped lasing medium, or a quasi-CW pumped lasing medium. A schematic view taken along section 3B—3B, in FIG. 3A, is illustrated in FIG. 3B. The laser cavity 31, should have a mirror 38, which should be at least as large as the cross-sectional area or the end face of the laser medium or rod 36, so that it is large enough to reflect the offset laser beam 41, that is originating from the region 37, that has the maximum population inversion or that is active or lasing. Additionally, the first or rear mirror 38, typically has a reflective surface or coating 46, so that a spot 45, is always reflecting the offset or off-axis laser beam 41. The SBSA (spinning beam steering assembly) 30, has means as discussed elsewhere to re-direct or direct the offset laser beam 41, to exit as on-axis laser beam 43. Typically the high repetition rate laser beam 34, and the on-axis laser beam 43, share the same axis as the SBSA's axis of rotation 44. The exiting laser beam 34, is typically defined by an aperture, such as an offset or off-axis aperture 17. The axis of rotation 44, for the SBSA 30, are always away from the offset laser beam centerline or axis 42. The laser cavity 31, is similar to the laser cavity 11, as discussed and described in FIG. 2A, except that the SBSA 30, is caused or made to rotate or spin about its axis at high speeds. Additionally, the axis 42, of the offset laser beam 41, that exits the lasing medium 36, should be off-set by at least one radius of the active or lasing region 37, from the optical axis 32, of the lasing medium 36. The lasing medium 36, can be pumped with energy by means 14, which are well known in the art. For example, if a solid state laser rod 36, is used then it can be optically pumped by a variety of means, such as, one or more laser diodes, one or more arc lamps, etc.. The reflector 12, is shown to be elliptical but it could be round or of some other shape. The need for the reflector 12, would of course depend upon the lasing medium 36, that is being used, and in some cases there would be no need for a reflector 12. As discussed earlier the use of off-axis apertures 17, will result in an active or lasing region 37, and an inactive or non-lasing region 35. The direction of rotation 39, for the SBSA 30, is shown as counter clockwise but similar results will be obtained if the SBSA 30, is rotated in a clock-wise or opposite direction.

In cases where a solid state laser rod is used it would be preferred that a Nd:YAG (Neodymium:Yttrium Aluminum Garnet) laser rod is used. Other solid state laser rods that could be used with this invention could be selected from a group comprising, i.e., Ti:Sapphire, Nd:Glass, Nd:YLF (Neodymium:Yttrium Lanthanum Fluoride), Cr:LiSAF or Cr:LiSrAlF$_6$ (Chromium:Lithium Strontium Aluminum Fluoride), to name a few.

The laser medium 36, could be selected from a group comprising, a solid laser medium, a liquid laser medium, such as, Rhodamin 6G, as used in dye lasers, or a gaseous laser medium, such as, $CO_2$, as used in $CO_2$ lasers, to name a few.

With the offset laser beam 41, having offset laser beam center-line or axis 42, offset parallel to and at a distance greater than its radius to the laser medium axis 32, as described above, the offset beam 41, may now be rotated or swept about the axis of rotation 44, of the SBSA 30. This essentially moves the active region 37, into the unused fully pumped rod volume or non-lasing region 35, to produce the high repetition rate laser beam 34. This allows pumping to occur in the laser medium 36, for the portions that follow a well defined circular path or region 48, to be swept by the offset laser beam 41, that are not being utilized by the active region 37, of the offset laser beam 41. This configuration allows greatly increased repetition rate while maintaining maximum peak pulse power by offsetting the apertures and spinning the SBSA 30, at a very high speed. This method may be applied to all CW pumped lasers, as well as some pulse pumped lasers to improve their repetition rate and average power.

By removing the Q-switch 26, continuous wave (CW) radiation results at a much higher average output power in a Gaussian mode than for a non-spinning aperture version.

By making the apertures 17, larger, low order multimode operation may be obtained in a similar manner as described above. As the SBSA 30, spins the aperture 17, moves to a new location along a well defined circular path 48, as discussed earlier.

FIG. 3C, shows the process of charging and discharging a laser medium 36, such as a solid state solid laser rod 36. The laser medium 36, could have an inner inactive region 47, a well defined circular path or region swept by the offset laser beam 48, and an outer inactive region 49. The active or lasing region 37, is always contained within the well defined circular path 48. As the SBSA 30, sweeps or spins or rotates, the offset laser beam 41, sweeps to a "new" fully pumped region 37, of the laser rod or medium 36, which is in line with the cavity/resonator defined by the offset aperture 17. The new maximum pulse rate is proportional to the number of aperture sized regions that will fit within the internal circumference of the laser rod or medium 36. For example, if the time it takes to fully repump the laser medium or rod 36, is 1 msec, as shown in FIG. 1, and if the offset laser beam 41, as shown in FIG. 3C, is caused to complete one sweep in 1 msec, (60,000 RPM), then the depleted (after pulsing) portion of the laser rod or medium 36, would be continuously and completely recharged or pumped during the time for one complete sweep or rotation. This shows a theoretical pulse repetition rate improvement of 12 times. This is calculated by knowing that greater than 12 beam diameters or active regions 37, will fit in the circumference of a laser rod or medium 36, therefore, at 60,000 RPM, the pulse repetition rate would increase to 12 KHz, with the same peak power per pulse. This is more clearly understood by looking at Figure 3C, where position A, indicates the maximum population inversion region or active or lasing region 37, at a time $t_2$, when the laser medium is fully pumped, fired and thereby fully depleted, as shown by the numeral 5, in FIG. 1. As the offset laser beam 41, as defined by the aperture 17, or SBSA 30, spins continuously at 60,000 RPM, it will move from region A, to the region at position B, in one twelfth of a millisecond. At a later time, the offset laser beam 41, will sweep through positions C, D, through L, depleting those regions. Meanwhile region A will be acquiring a greater population inversion due to being continuously pumped by a pumping source 14. By the time the offset or off-axis laser beam 41, sweeps to position L, the population inversion at region A, shall be even greater, close to saturation and thereby the region A, shall be fully pumped and ready to fire again when the offset laser beam 41, with the active lasing region 37, has swept through the well defined circular path 48, and is now back at position A.

The regions A through L are for purposes of illustration only and are not discrete regions, but are contiguous regions which are being continuously pumped by the pumping radiation 15, as they are fired and depleted. For example, as position A gets fully pumped, fired and depleted in the active or lasing region 37, the offset laser beam 41, rotates to the fully pumped position B, which is fired and depleted. The offset laser beam 41, in turn is rotated into regions C, D, E, etc., in succession, while the depleted position, such as, A, B, C, etc., are being pumped. Therefore, in this example, the laser rod or media 36, can be fired 12 times per revolution of the offset laser beam 41, yielding a 12 KHz pulse repetition rate, which is a 12 times improvement over a stationary laser beam of the prior art. For maximum pulse power, the laser medium or rod 36, is fully pumped before it is fired, which for example, for a typical Nd:YAG laser of the prior art is approximately 1 msec. Whereas, in this invention the laser has already fired twelve times in 1 msec with the peak powers of each pulse at the same intensity as if it were from a small diameter stationary beam pulsing at 1 pulse per msec. Similarly, a 24 times improvement could be achieved if 24 aperture size regions could be fitted within the internal circumference of the laser medium 36, while maintaining the same rotational speed for the offset laser beam 41. For laser medium composed of different materials, the rotational speed of the offset beam should be adjusted according to its particular pump or repump or depletion time. Similarly, larger diameter laser mediums may require proportionally higher pumping rates.

Larger diameter laser media allows for proportionally higher repetition rates or lower rotational speeds. For example, Nd:YAG laser rods are available in larger diameters which would allow even higher repetition rates, than illustrated in FIG. 3C.

This method for increasing the firing or pulse repetition rate of a laser is particularly useful when considering its applications in material processing where through-put is a consideration. A twelve-fold increase in laser repetition rate corresponds directly to a twelve-fold increase in tool through-put.

Figure 4:
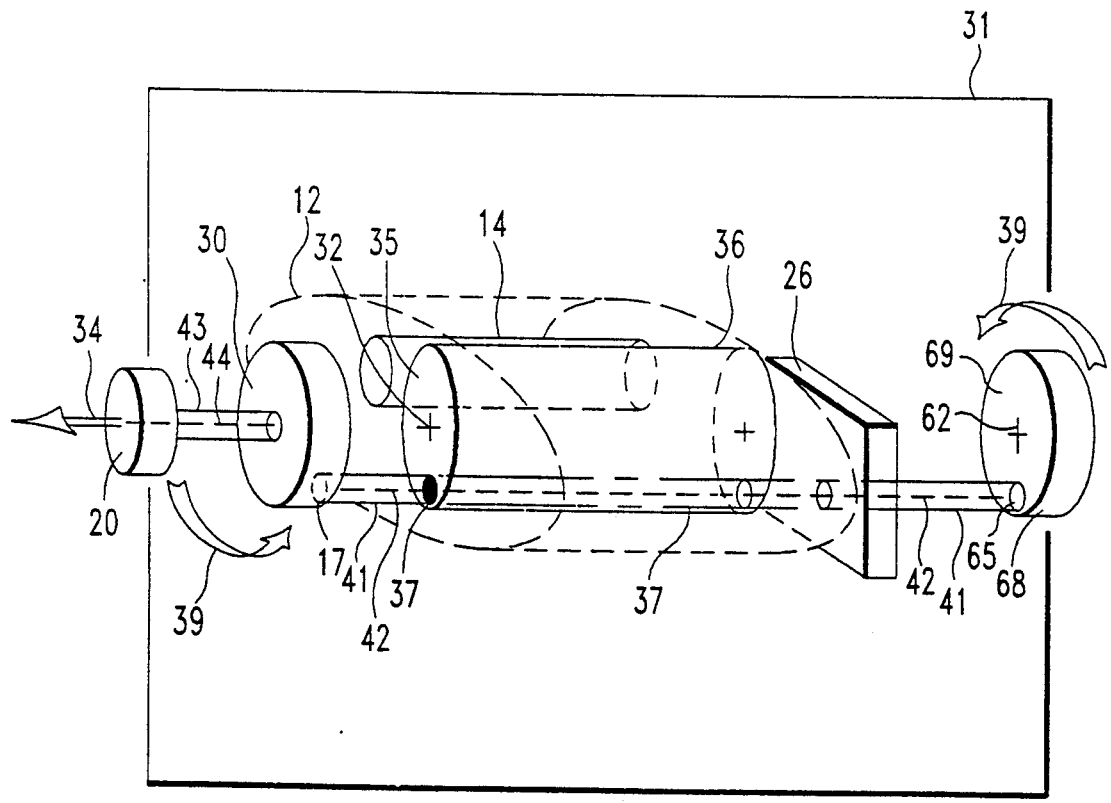
FIG. 4, illustrates another embodiment of this invention, showing the enhanced laser system with at least one rotating mirror.

FIG. 4, illustrates another embodiment of this invention. This embodiment again has been discussed using a solid state laser rod, but, any pumped lasing medium can be used with this invention. The laser cavity 31, should have a rotating mirror assembly 68, with an offset mirrored spot 65, which can be considered as another embodiment of a SBSA. This offset mirrored spot 65, is also an affective aperture, and therefore the SBSA 30, could be eliminated, and this embodiment could function similar to the embodiment shown in FIG. 3A. The rotating mirror assembly 68, should be at least as large as the end face or cross-sectional area of the laser medium or rod 36, so that the offset mirrored spot 65, reflects the offset laser beam 41, that originates from the active or lasing region 37, as more clearly discussed in reference to FIGS. 3A, 3B and 3C. The SBSA (spinning beam steering assembly) 30, has means as discussed elsewhere to direct the offset laser beam 41, to exit as on-axis laser beam 43. Typically the high repetition rate laser beam 34, and the on-axis laser beam 43, share the same axis as the SBSA's axis or rotation 44. The exiting laser beam 34, is typically defined by an aperture, such as an offset or off-axis aperture 17. This axis of rotation 44, for the SBSA 30, is always away from the offset laser beam centerline or axis 42. The laser cavity 31, is similar to the laser cavity 11, as discusses and described in FIG. 2A, except that the SBSA 30, and the rotating mirror assembly 68, are caused or made to rotate or spin about their axis at high speeds. Additionally, the axis 42, of the offset laser beam 41, that exits the lasing medium 36, should be off-set by at least one radius of the active or lasing region 37, from the optical axis 32, of the lasing medium 36. The lasing medium 36, can be pumped with energy by means 14, which are well known in the art. For example, the means 14, for creating the population inversion in at least a portion of the laser medium 36, could be selected from a group comprising electromagnetic radiation, electrical discharge, chemical excitation, thermal excitation, mechanical excitation, to name a few. Additionally, the means could be one or more laser diodes, or one or more arc lamps, etc. As discussed earlier the use of apertures 17, will result in an active or lasing region 37, and an inactive or non-lasing region 35. In the preferred embodiment the rotating mirror assembly 68, has a mirror spin or rotation axis 62, an offset mirrored or reflective spot 65, and a non-reflective region or area 69. The center axis for the mirrored reflective spot 65, is the same as the offset beam axis 42, so that the offset aperture 17, and the offset reflective spot 65, rotate synchronously. Additionally, the mirror spin axis 62, is in alignment with the axis of rotation 44, of the SBSA 30. Because, the rotating mirror 68, has a non-reflective area 69, the laser light that hits the non-reflective region 69, does not lase and is not reflected back. The direction of rotation 39, for the SBSA 30, and the rotating mirror 68, is shown as counter clockwise but similar results will be obtained if the SBSA 30, and the rotating mirror 68, are rotated in a clock-wise or opposite direction. The means (not shown) for rotating the rotating mirror 68, could be selected from a group comprising an electric motor or a hydraulic motor or air driven gas motor or a turbine, to name a few. The only requirement that must be met is that both the SBSA 30, and the rotating mirror 68, must rotate in the same direction and that they both must rotate synchronously. Even in cases where the region 69, is reflective the laser beam 34, would not be adversely affected as the aperture 17, will be at least partially defining the on-axis laser beam 43, that exits as the high repetition rate laser beam 34.

Figure 5A:
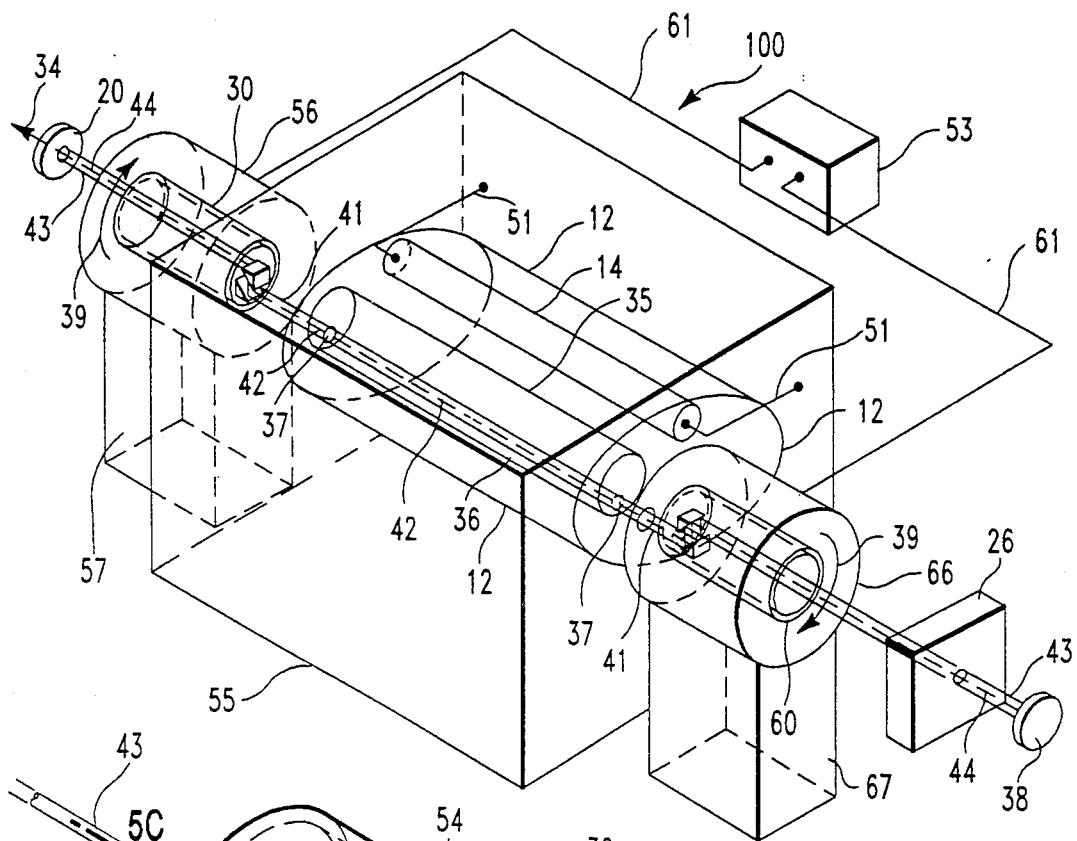
FIG. 5A, illustrates an embodiment of this invention, where the laser medium is stationary and the offset apertures are rotated.

An enhanced laser system 100, incorporating the SBSA 30, and 60, is shown in FIG. 5A. A hollow rotor motor 56, spins the SBSA 30, and typically contains it, as shown in FIG. 5A. The hollow rotor motor 56, is held securely in place by a motor support pedestal 57. In some situations it may be advantageous to mount a second or an additional SBSA 60, to the backside or the opposite end of the lasing medium housing assembly 55. This embodiment utilizes a second or additional SBSA 60, which is very similar to the SBSA 30. The SBSA 60, would be contained inside a second or additional hollow rotor motor 66, that is secured to a second or additional motor support pedestal 67. The means for rotating the SBSA 30 or SBSA 60, could be selected from a group comprising an electric motor or a hydraulic motor or air driven gas motor or a turbine, to name a few. Alternatively, a high speed motor could be used with a magnetic coupling or a belt and pulley or gears, setup with appropriate ratios to achieve the desired rotational speed.

The motor 56 or 66, could be an electric motor or a hydraulic motor or air driven gas motor or a turbine that is used to spin the SBSA. Additionally, there could be other means to rotate the SBSA, such as by placing cups or paddles on the outside housing of the SBSA, and having the SBSA spin due to the movement of a fluid. This fluid could also be used as a cooling fluid and/or as a lubricant for the motor or the SBSA. Similarly, the cooling fluid used to cool the lasing medium could also be used to spin the motor or the SBSA.

The bearing for the motor and SBSA, could be made from porous or non-porous plastic or metal. Similarly, conventional ball bearings could also be used in place of the bearing. A pressurized fluid could act as a lubricant for a journal bearing and would be an alternate method to replacing the conventional ball bearings. Similarly, air or gas or magnetic bearings could also be used as high speed bearing.

Additionally, the hollow rotor motor 56 and 66, should either be hollow or have means to allow the passage of a laser beam in the formation of the high repetition rate laser beam 34.

Laser medium housing assembly 55, contains a laser medium 36, which is mounted inside the container or housing, by methods well known in the art. FIG. 5A, shows an embodiment of a laser medium 36, which is a laser rod contained within the reflector 12. In situations where the components inside the reflector 12, get too hot, then in those cases the cavity in the reflector 12, is usually filled with cooling fluid, such as water or other liquids or gas, which could also be used to cool the pumping source 14, such as an arc lamp. The pumping source 14, is typically connected to an electric power source (not shown) via wires or electrical connection 51. It should be noted that the laser medium housing assembly 55, is a stand-alone field removable or replaceable laser medium housing assembly. This assembly 55, has an advantage that it can be removed or replaced from the enhanced laser system 100, or interchanged with a similar housing, without affecting or disturbing the other components of the system. This has an additional advantage that different lasing mediums can be used for the same set-up. This can be done by just changing the self-contained assembly 55, that houses one or more of the laser mediums 36, with another comparable assembly 55.

Figure 5B:
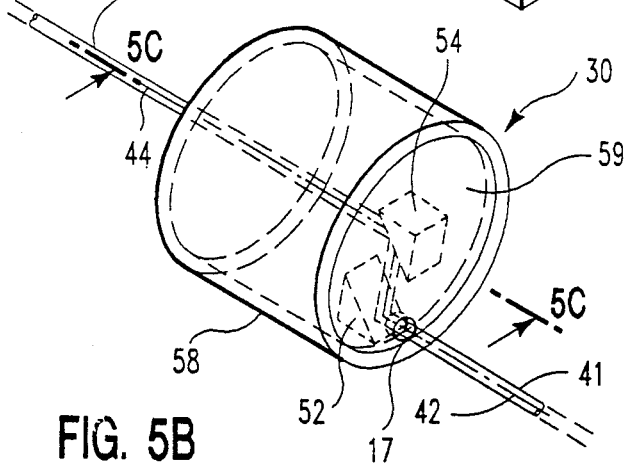
FIG. 5B, is a schematic close-up view of a spinning beam steering assembly (SBSA).
Figure 5C:
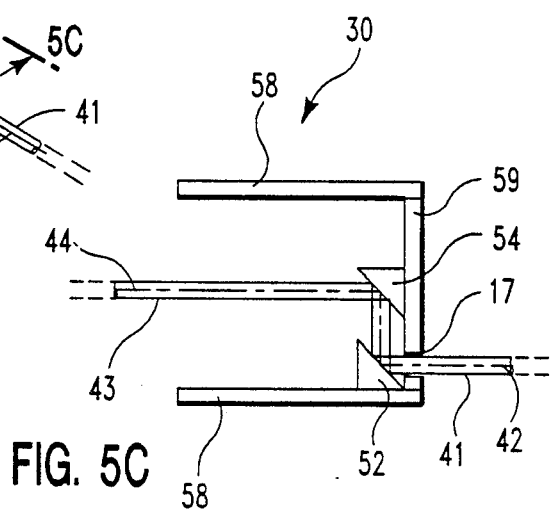
FIG. 5C, is a cross-sectional view of the rotating aperture taken along section 5C—5C, in FIG. 5B.

This preferred embodiment of the enhanced pumped laser system 100, as shown in FIGS. 5A, 5B and 5C, utilizes two synchronized spinning beam steering assemblies. The SBSA 30, as shown in an enlarged view in FIG. 5B, consists of at least one off-axis or offset aperture 17, at least one off-axis mirror or prism 52, and at least one on-axis mirror or prism 54. The aperture 17, could be physically a part of the SBSA 30, or it could be located elsewhere, as long as the aperture 17, helps in defining the on-axis laser beam 43. The off-axis mirror 52, and on-axis mirror 54, are usually a part of the SBSA 30, and they must rotate with the SBSA 30. The rotating mirrors 52 and 54, shown enlarged in FIGS. 5B and 5C, serve to scan the outer circumference of the fixed laser medium 36, and redirect the offset laser beam 41, to the center of the axis of rotation 44, of the SBSA 30.

Figure 9:
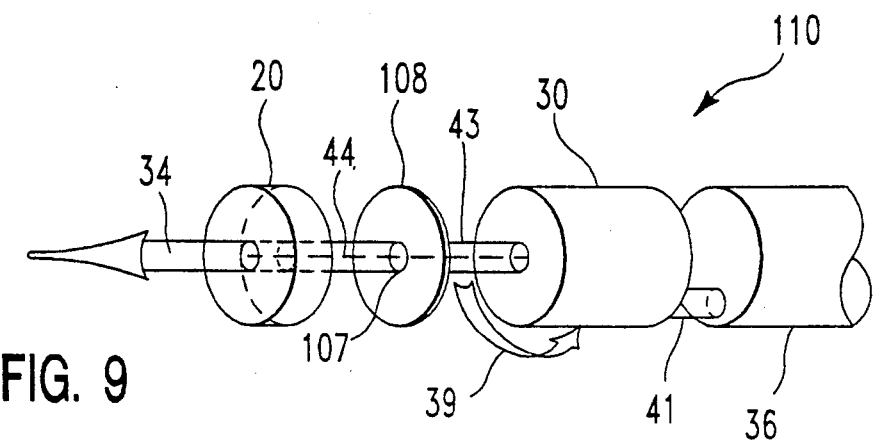
FIG. 9, illustrates yet another embodiment of this invention showing a stationary or non-rotating aperture.

FIG. 5C, shows a cutaway of a simple SBSA 30, of this invention. The SBSA 30, typically consists of an outer housing 58, an end plate 59, and beam steering mirrors 52 and 54. The end plate 59, could be facing the laser medium housing assembly 55, and having an offset aperture 17, as shown in FIG. 5A, or it could be facing the mirror 20, and have an on-axis aperture (not shown). In some cases there would be no need for an end plate 59, and the aperture 17, could be defined by other means, such as shown in FIG. 9, or have an adjustable iris that defines a variable or adjustable type aperture. On-axis mirror 54, is positioned on the axis of rotation 44, so that the offset laser beam 41, coming from the offset or off-axis mirror 52, is redirected and allowed to exit on the spin axis 44, of the SBSA 30. The SBSA 30 and 60, are synchronized by at least one motor drive and synchronization apparatus 53, using motor drive and synchronization connections 61.

Figure 6:
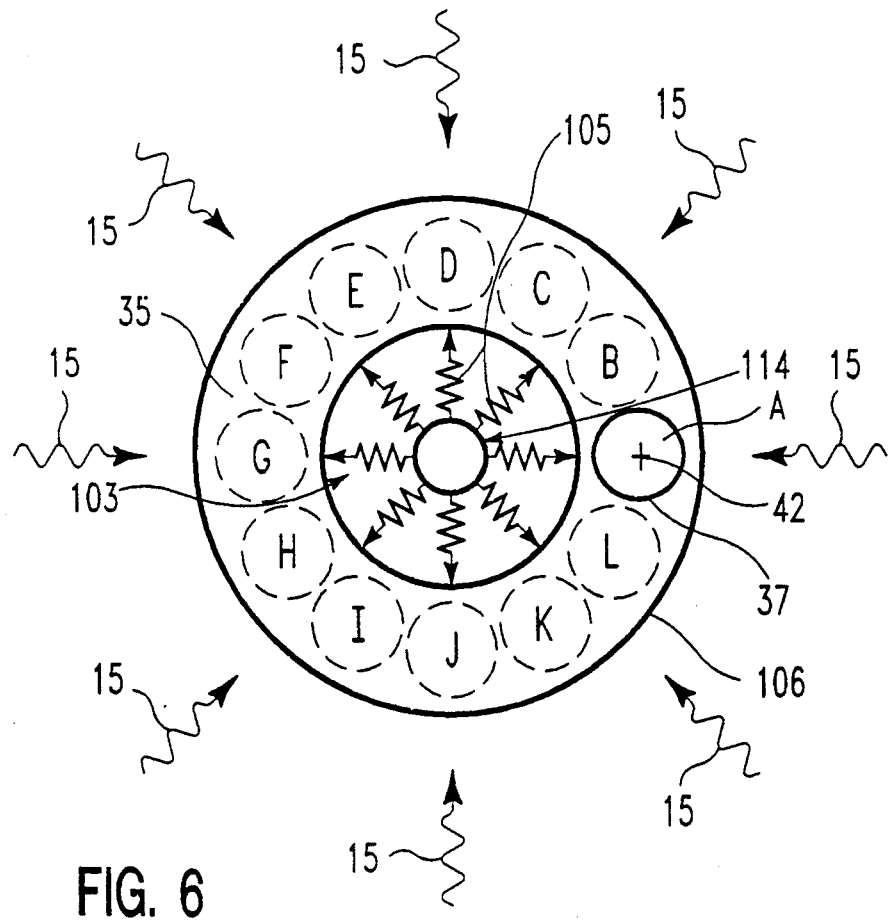
FIG. 6, illustrates another embodiment of this invention showing the hollow lasing medium.

An alternate embodiment of pumping the laser medium 36, is shown in FIG. 6. This embodiment discloses a hollow lasing medium 106, such as a hollow solid state laser rod, having at least one hollow region 103, which allows the addition of at least one pumping source 114, such as an arc lamp, providing pumping radiation or light rays or photons 105, from the inside of the hollow lasing medium 106. Additionally, the hollow region 103, can be cooled by pumping cooling fluid, such as water or other liquid or gas through it. The outside of the hollow lasing medium 106, can also be cooled and pumped as discussed and described earlier.

Other pumping sources, as discussed elsewhere, can also be used in place of the conventional arc lamp or laser diode pumping or also in conjunction with the arc lamp or laser diode pumping.

Figure 7A:
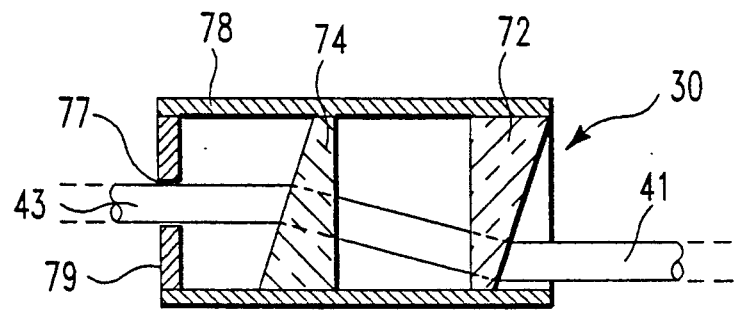
FIGS. 7A, 7B, 7C and 7D, illustrate a few embodiments of the spinning beam steering assembly.

FIGS. 7A, 7B, 7C and 7D, illustrate different embodiments of the spinning beam steering assembly (SBSA). These embodiments are for illustration purposes only and are not limiting. FIG. 7A, illustrates a SBSA 30, incorporating two identical cylindrical glass prisms, namely, a first prism 72, and a second prism 74, mounted in housing 78, with the angled faces of these prisms mounted parallel to each other. The angled face of the first prism 72, causes the off-axis or offset laser beam 41, to bend towards the axis of rotation, while the angled face of the second prism 74, causes the on-axis laser beam 43, to refract or bend onto and parallel to the spin axis. The on-axis aperture 77, is centered in end plate 79, which is attached to housing 78, and is rotated with the housing 78, as a unit. Each face of the prisms 72 and 74, may be coated with an appropriate coating to enhance the transmission of the desired laser beam.

Although the end plate 79, is shown with an aperture 77, centered about the spin axis, an aperture can be placed off-axis in the end plate 79, similar to the one shown in FIG. 5C, and the end plate can be mounted in the opposite end of the housing 78, facing the laser medium 36. Alternately, the end plate 79, could be completely removed and the aperture 77, could be directly coated on the prism, using appropriate methods, on either or both angled faces. One way of doing this would be by making the portions in the prism 72 and 74, that allow the passage of the laser beam to be transparent, while the other portions are made translucent or reflective or opaque or diffusive.

Figure 7B:
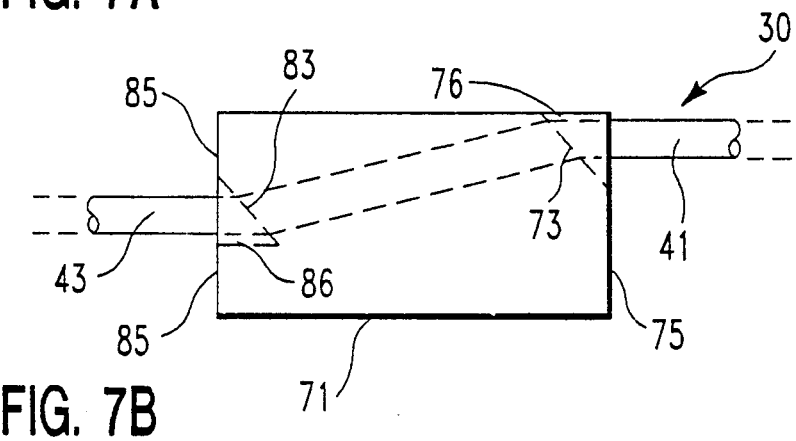

Another embodiment of the SBSA 30, is illustrated in FIG. 7B. In this embodiment, a solid transparent piece of glass 71, which is usually a solid cylindrical glass, is fabricated with an off-axis etched pocket 76, and an on-axis etched pocket 86, in end faces 75 and 85, respectively, wherein off-axis angled transmissive face 73, and on-axis angled transmissive face 83, are parallel to each other. The off-axis laser beam 41, passes through the off-axis angled transmissive face 73, and is refracted or bent towards the axis of rotation until it strikes the on-axis angled transmissive face 83, where it is refracted or bent so that it becomes parallel to the axis of rotation of the SBSA 30, and exits as on-axis laser beam 43.

The off-axis angled transmissive face 73, and the on-axis transmissive face 83, in FIG. 7B, are shown less than the full size of the end faces 75 and 85, respectively. However, full end faces 75 or 85, or both could be used to define an affective aperture region by fabricating the solid transparent SBSA 71, so that off-axis etched pocket 76, or on-axis etched pocket 86, occupy the entire end-face areas 75 and 85. In this case the affective aperture can be defined by directly coating one or both angled transmissive faces 83 or 73, using appropriate methods. For example, a portion of the off-axis angled transmissive face 73, and a portion of the on-axis angled transmissive face 83, could remain transparent, thus forming an affective aperture, while other portions are made opaque or translucent or non-transparent. Again, an on-axis aperture in a stationary plate, or an on-axis or an off-axis aperture in a rotating plate may be used in conjunction with this embodiment or to further define the exiting laser beam.

Figure 7C:
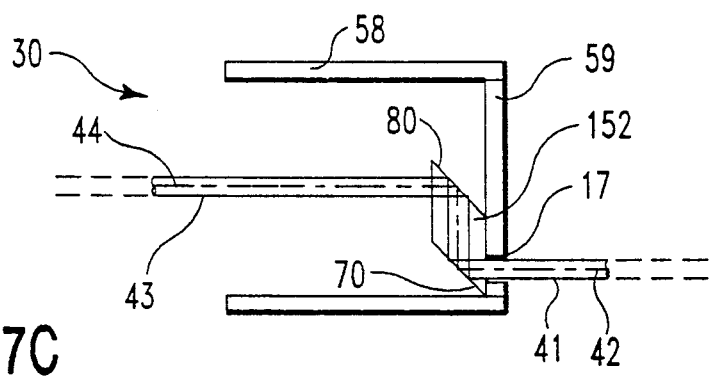

FIG. 7C, shows yet another embodiment of the SBSA 30. Shown is a solid one piece prism 152, with an off-axis totally internal reflection face 70, and an on-axis totally internal reflection face 80. The prism 152, is mounted in end plate 59, and securely attached to the outer housing 58. The off-axis or offset laser beam 41, passes through the aperture 17, and into the prism 152, where it strikes the off-axis totally internal reflection face 70. The laser beam is then reflected towards the spin axis 44, where it strikes the on-axis totally internal reflection face 80, where it is reflected or bent so that it becomes parallel to the axis of rotation of the SBSA 30, and exits as an on-axis laser beam 43.

The aperture 17, in end plate 59, can be placed on the opposite end of the outer housing 58, with the aperture 17, placed on the axis of rotation of the SBSA 30. Likewise, the aperture can be a stand alone aperture 107, as discussed and described in FIG. 9.

Additionally, the prism 152, could be made using two separate prisms, where the first prism would incorporate the off-axis totally internal reflection face 70, while the second prism would have the on-axis totally internal reflection face 80, to produce the on-axis laser beam 43. Each face 70 or 80, of the prism may be coated with an appropriate coating to enhance the transmission of the desired laser beam.

SBSA's such as shown in FIGS. 5A, 7A, 7B, 7C or 7D, should be well balanced, as this is important when rotating at very high rates. This static and/or dynamic balancing can be performed by those skilled in the art to insure that a well defined laser beam is produced.

Although glass has been chosen as the preferred embodiment for the SBSA's shown in FIGS. 7A or 7B, any suitable material such as transparent plastics, epoxies, synthetic or natural crystals or minerals, etc., may be used.

Figure 7D:
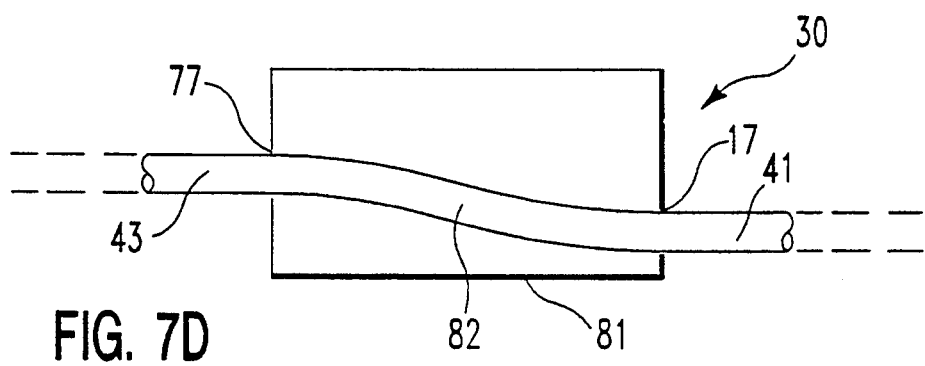

FIG. 7D, illustrates yet another embodiment of the SBSA 30 wherein the SBSA is composed of a light-pipe 82, held rigidly by a rotating light-pipe housing 81. The off-axis laser beam 41, passes through the off-axis or offset aperture 17, defined by the diameter of the light-pipe 82. The laser beam is refracted or reflected along the light-pipe until it exits through on-axis aperture 77, and parallel to the SBSA's axis of rotation.

The light-pipe 82, may be selected from a group suitable for such an application, for example, optical fibers, optical waveguides, to name a few.

Figure 8A:
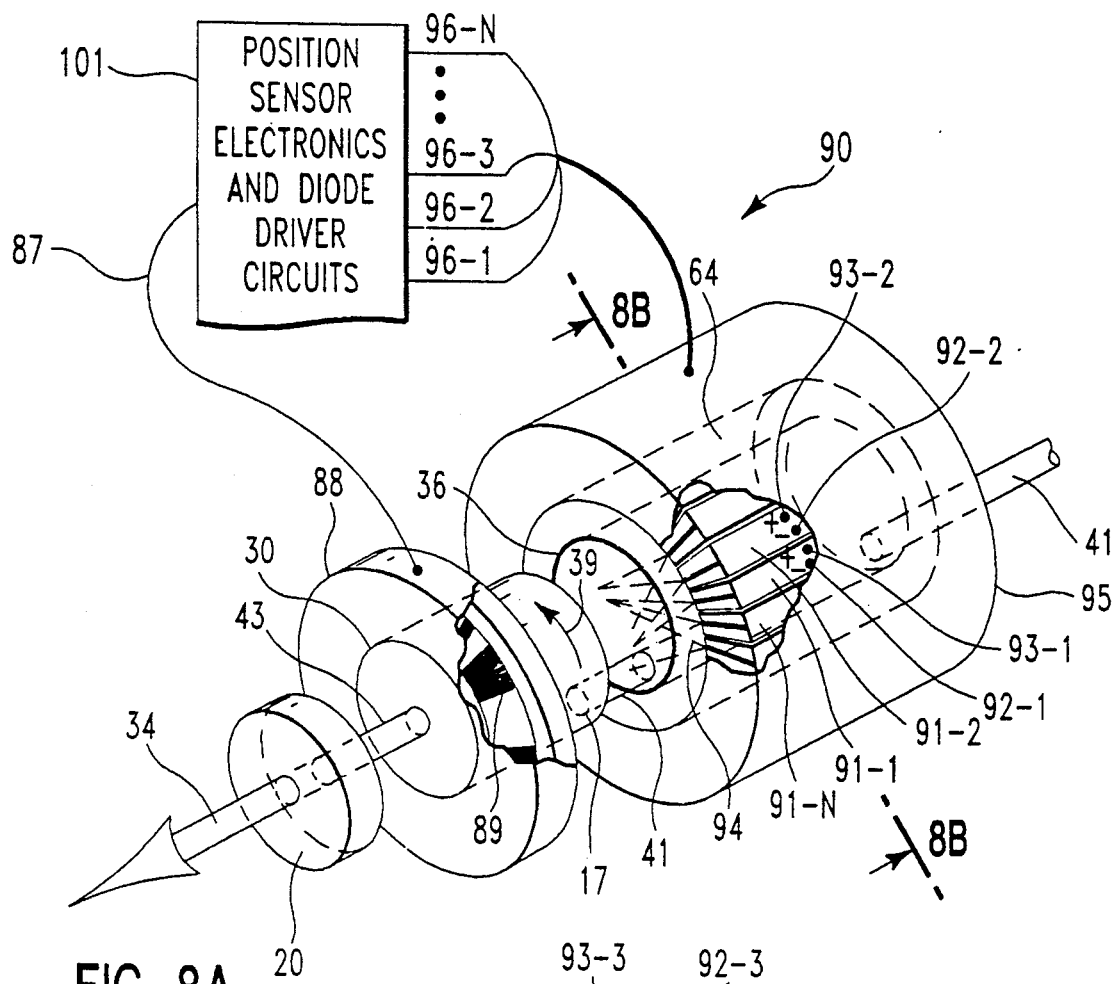
FIG. 8A, illustrates another embodiment of this invention showing a sequential laser diode pump system.
Figure 8B:
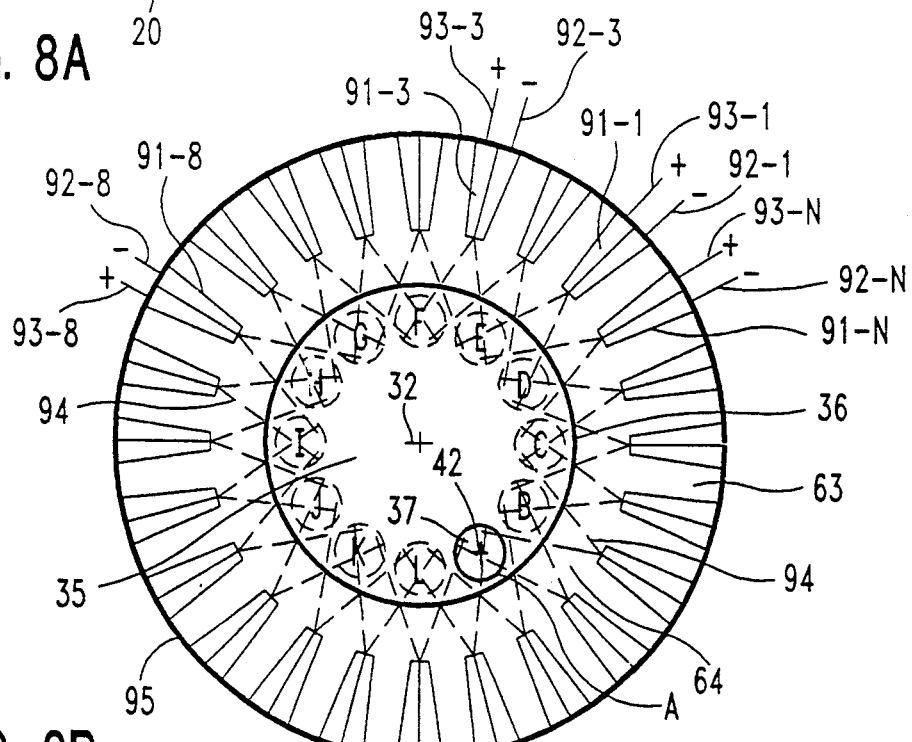
FIG. 8B, is a cross-sectional view of the sequential laser diode pump system taken along section 8B—8B in FIG. 8A.

FIGS. 8A, and 8B illustrate another embodiment of the present invention showing a sequential laser diode pumping system 90. FIGS. 8A and 8B, are a schematic representation of the embodiment showing laser diode arrays or bars (LDA) 91-1, 91-2 , . . . through 91-N, closely spaced about the perimeter of the laser medium 36, and contained within the laser diode housing assembly 95. The LDA beam 94, from each of the laser diode arrays 91-1 through 91-N, is directed onto the laser medium 36. It is preferred that each LDA beam 94, overlaps the beam of its neighboring LDA 91.

A rotary encoder 89, is rigidly attached to the SBSA 30, and rotates with it. An encoder housing 88, containing appropriate sensing elements is mounted proximate to the encoder 89, and transmits encoded position signals through the attached encoder signal wire 87, to the position sensor electronics and laser diode driver circuit unit 101. The position sensor electronics circuit decodes the encoded position signals and synchronizes the pulsing of the LDA's through the appropriate laser diode drive circuit and associated laser diode electrical connections 96-1 through 96-N, to the position of the SBSA 30. Each laser diode electrical connection 96-1, 96-2 , . . . through 96-N, contains a laser diode negative connection 92-1 through 92-N, and a laser diode positive connection 93-1 through 93-N, respectively.

FIG. 8B, is a sectional view of FIG. 8A, taken along section lines 8B—8B. LDA's 91-1 through 91-N, are arranged circumferential about the laser medium 36. LDA beams 94, are directed so that the output beams of at least two LDA's overlap. The space or gap 64, between the LDA's 91, and the laser medium 36, as well as the space or gap 63, between the individual LDA's may, if required, contain cooling fluid to aid in heat removal. Letters A, B, C, through L indicate regions in the laser medium 36, that are swept by the offset laser beam 37, at different times as it revolves about the laser medium 36.

As the SBSA 30, spins, the offset laser beam 41, sweeps through the lasing region 37, in the laser medium 36 as described in FIG. 3C and FIG. 6. As 20 the offset laser beam 41, sweeps through region A, a LDA, 91-1 for example, is triggered and emits pumping radiation proximate to regions D and E. This pumping radiation at least partially pumps the laser medium in these regions. As the beam sweeps between the regions A and B, LDA 91-2 is triggered and emits its pumping radiation upon demand proximate to region E as well as the areas between region E and regions D and F. The area between region D and E has now seen the pumping radiation of at least 2 LDA's and now could be fully pumped and ready to be swept by the offset laser beam 41. The region E will be at least partially pumped having seen the pumping radiation of at least 1 LDA. In a similar manner, as the laser beam sweeps through region B, LDA 91-3 will be triggered, emitting its pumping radiation proximate to regions E and F. Region E could now become fully pumped and would be ready to lase as it is swept by the offset laser beam 41. The area between regions E and F will likewise be at least partially pumped and region F will acquire some pumping. The pumping continues in sequence through regions G, H, I through L and A while the offset laser beam 41, sweeps through the now pumped regions C, D, E, through L, etc.

The position sensor electronics and diode driver circuits 101, allow optimization of the phase between the LDA's firing and the arrival of the swept laser beam, using encoder signal wire 87. The diode driver circuits also control the "on" or lasing time of the LDA's so that at least one LDA is on at any instant, thereby providing quasi CW pumping.

One benefit of having sequential pumping is that each LDA is on for only a short time while providing a uniformly pumped region to be swept by the offset laser beam.

FIG. 9, illustrates yet another embodiment 110, of the enhanced laser system 100, showing a SBSA 30, and a stationary or stand-alone aperture 107, in a stationary or stand-alone plate 108. The stationary or stand-alone aperture 107, is centered on the on-axis beam 43 or axis of rotation 44. The aperture 107, is identical to apertures 17 or 77, in that it functions to define the allowable laser beam path through the appropriate SBSA 30, and the laser medium 36, but does not rotate with the SBSA 30. The SBSA 30, causes the on-axis beam 43, to be offset and to be swept through the laser medium 36, as described previously. A stationary or stand-alone aperture 107, has the advantage of being able to be adjusted for aperture size and location while the laser is in operation.

Figure 10:
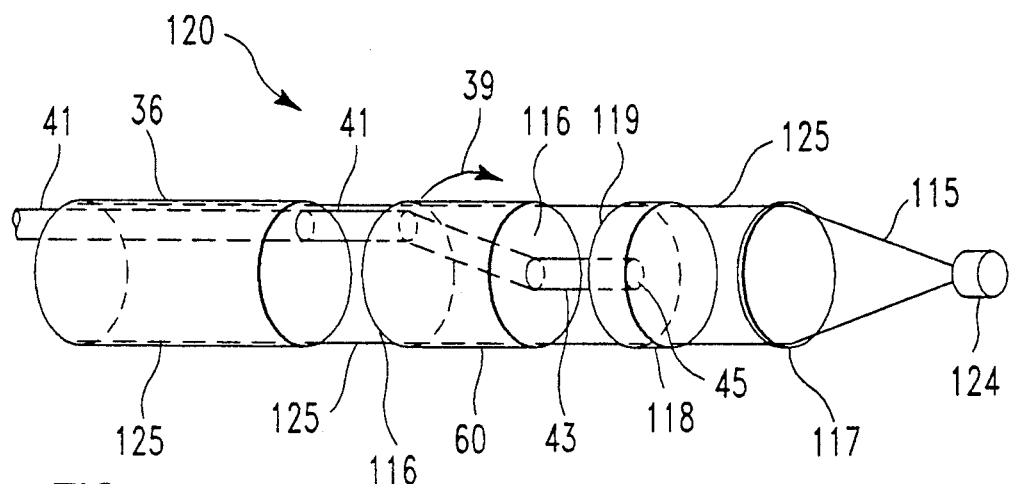
FIG. 10, illustrates yet another embodiment of the enhanced laser system of this invention showing end pumping of the lasing medium.

FIG. 10, shows still another embodiment 120, of the enhanced laser system 100, showing end pumping of the laser medium while incorporating a SBSA. End pumping is accomplished by using an appropriate pump source 124, for example, the pump source 124, could be a laser diode, a light-pipe system, etc. The pump radiation 115, is directed towards the laser medium 36, by a collimating system 117, through the end-mirror 118, and a SBSA 60. The end mirror 118, has coatings 119, which allow most of the collimated pumping radiation 125, to pass through while reflecting almost all the laser radiation at 45, back into the lasing medium to produce the laser beam 43 and 41. The SBSA 60, is transparent to the pumping radiation 125, and has highly transmissive coatings 116, on both end faces to allow as much pumping radiation to pass through as possible, which is to be used in pumping the laser medium 36. The on-axis laser beam 43, and off-axis laser beam 41, also pass through the SBSA 60, as described earlier to sweep the end-pumped laser medium 36. In this embodiment the high repetition rate laser beam 34, would be typically produced at the end opposite that of the end pumping source 124.

Figure 11:
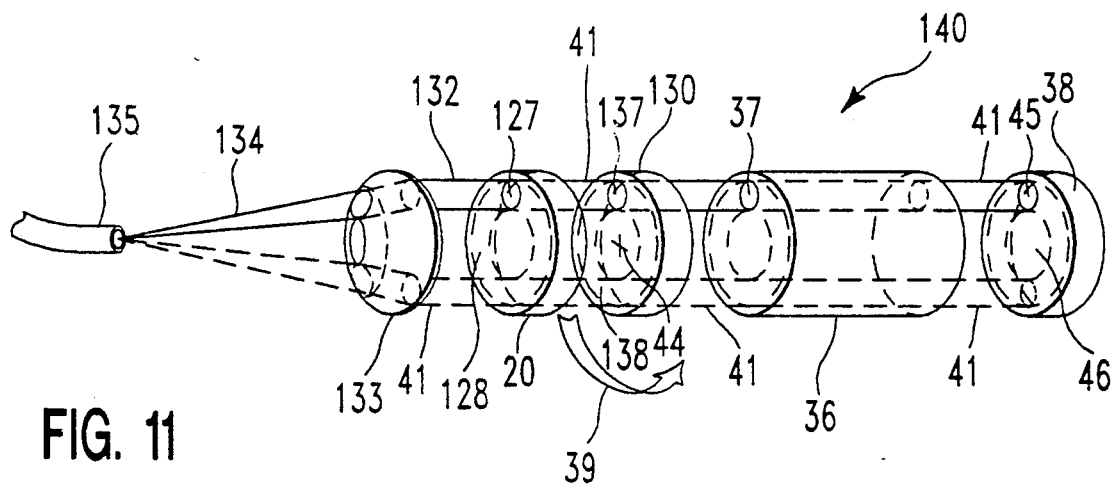
FIG. 11, illustrates still another embodiment of the enhanced laser system of this invention using a spinning aperture assembly.

FIG. 11, shows yet another embodiment 140, of the enhanced laser system 100, using a spinning aperture assembly 130, and having a sweeping output beam 132. The spinning aperture assembly 130, contains an aperture 137, which is spun about the axis of rotation 44. Mirrors 20, and 38 are large enough to encompass the swept beam path 128. As the spinning aperture assembly 130, sweeps the offset laser beam 41, through the corresponding swept beam path 138, in the pumped laser medium 36, the offset laser beam 41, remains offset and rotates about the axis of rotation 44, of the spinning aperture assembly 130. Mirror 20, is preferably an output coupler mirror which is large enough to accommodate the sweeping output laser beam 132. The numeral 127, shows an area through which offset laser beam 41, passes through. Lens assembly 133, may be used if desired to create a focussed output laser beam 134, which converges at the focal point of the lens assembly 133. The converged output laser beam 134, may be coupled into a light pipe 135, for example, one or more optical fiber, to be used remotely as required, or processing may if desired, be done at or near the focal point of the converging output beam 134.

Alternately the lens assembly 133, may be eliminated in some instances, producing a revolving or rotating output laser beam 132, which may be desirable for some processes, such as, heat treating round parts or for performing trepanning operations, etc.

For an embodiment having a trepanning laser beam output, at least a portion of this trepanning laser beam output could also be directed towards at least a portion of at least one means, such as a light pipe, which is large enough to accommodate the trepanning laser beam. The resulting laser beam at the output end of the for example light pipe would be on the axis of the light pipe and would now no longer be trepanning.

For the purposes of illustration the SBSA 30, 60 or 68, have been shown to be a rotating system, but, one skilled in the art could use other beam scanning systems to provide the at least one means for sweeping the allowable laser beam path through the population inverted region of the at least one laser medium. Examples of other beam scanning or sweeping means are available in the art, see for example, Hecht, Jeff, "UNDERSTANDING LASERS An Entry-Level Guide", IEEE, pages 165-166 (1992), the disclosure of which is incorporated herein by reference. For example, the at least one means for sweeping the allowable laser beam path could be selected from a group comprising at least one galvanometer scanner or resonant scanner or rotating polygon scanner or electro-optic scanner or holographic scanner or acousto-optic scanner, to name a few.

While the present invention has been particularly described in conjunction with specific preferred embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. An enhanced pumped laser system comprising:
   a) at least one laser medium for forming a laser beam, said laser beam having a laser beam axis,
   b) at least one means for pumping at least a portion of said at least one laser medium, wherein said pumping causes a population inversion in at least a portion of said at least one laser medium,
   c) at least one means for defining an allowable laser beam path, wherein said allowable laser beam path is smaller than the cross-section of said at least one laser medium,
   d) at least one means for sweeping said allowable laser beam path through said population inverted region of said at least one laser medium,
   e) at least one first mirror to reflect at least a portion of said laser beam,
   f) at least one second mirror, wherein said second mirror is an output coupler mirror to reflect at least a portion of said laser beam, wherein said second mirror is opposite said first mirror, and
   g) wherein said laser beam passes through said means for defining an allowable laser beam path and at least a portion of said laser beam reflects off a portion of said first and second mirrors during the sweeping of said population inversion region of said at least one laser medium, thereby forming said enhanced pumped laser system.

2. The enhanced pumped laser system of claim 1, wherein at least a portion of said laser medium is pumped while at least a portion of said laser medium lases simultaneously.

3. The enhanced pumped laser system of claim 1, wherein said at least one means for defining an allowable laser beam path is an aperture.

4. The enhanced pumped laser system of claim 3, wherein said aperture is an integral part of at least one spinning beam steering assembly (SBSA).

5. The enhanced pumped laser system of claim 3, wherein said aperture is a variable aperture.

6. The enhanced pumped laser system of claim 1, wherein said at least one means for sweeping said allowable laser beam path is selected from a group consisting at least one galvanometer scanner or resonant scanner or rotating polygon scanner or electro-optic scanner or holographic scanner or acousto-optic scanner.

7. The enhanced pumped laser system of claim 1, wherein said at least one means for sweeping said allowable laser beam path is at least one spinning beam steering assembly (SBSA).

8. The enhanced pumped laser system of claim 7, wherein said at least one SBSA is rotated by at least one rotating means, wherein said rotating means are selected from a group comprising an electric motor or a hydraulic motor or air driven gas motor or a turbine.

9. The enhanced pumped laser system of claim 7, wherein said at least one SBSA has at least one means for lubrication while said at least one SBSA is rotating.

10. The enhanced pumped laser system of claim 9, wherein said lubrication to said at least one rotating SBSA is provided by at least one cooling fluid.

11. The enhanced pumped laser system of claim 7, wherein said pumping is done towards at least a portion or at least one end of said at least one laser medium, and wherein said pumping laser radiation passes through at least a portion of said at least one SBSA.

12. The enhanced pumped laser system of claim 7, wherein said SBSA has at least one means to re-direct at least a portion of said laser beam.

13. The enhanced pumped laser system of claim 12, wherein said at least one means to re-direct at least a portion of said laser beam is at least one prism.

14. The enhanced pumped laser system of claim 12, wherein said at least one means to re-direct at least a portion of said laser beam is at least one light pipe.

15. The enhanced pumped laser system of claim 12, wherein said at least one means to re-direct at least a portion of said laser beam is at least two etched pockets.

16. The enhanced pumped laser system of claim 12, wherein said at least one means to re-direct at least a portion of said laser beam is at least two mirrors.

17. The enhanced pumped laser system of claim 12, wherein said at least one means to re-direct at least a portion of said laser beam is at least one reflective means.

18. The enhanced pumped laser system of claim 12, wherein said at least one means to re-direct at least a portion of said laser beam is at least one refractive means.

19. The enhanced pumped laser system of claim 1, wherein said laser medium is selected from a group comprising a solid laser medium, a liquid laser medium or a gaseous laser medium.

20. The enhanced pumped laser system of claim 1, wherein said at least one means for creating said population inversion in at least a portion of said laser medium is selected from a group comprising electromagnetic radiation, electrical discharge, chemical excitation, thermal excitation or mechanical excitation.

21. The enhanced pumped laser system of claim 1, wherein at least a portion of said at least one laser medium is hollow.

22. The enhanced pumped laser system of claim 21, wherein at least a portion of said hollow laser medium is cooled from inside said hollow portion of said hollow laser medium or outside of said hollow laser medium or both.

23. The enhanced pumped laser system of claim 21, wherein at least a portion of said hollow laser medium is pumped from inside said hollow portion of said hollow laser medium or outside of said hollow laser medium or both.

24. The enhanced pumped laser system of claim 1, wherein said at least one laser medium comprises a lasing portion and a non-lasing portion, and wherein at least a portion of said non-lasing portion is pumped by said at least one means for pumping said at least one laser medium.

25. The enhanced pumped laser system of claim 1, wherein at least one Q-switch controls the passage of said laser beam.

26. The enhanced pumped laser system of claim 1, wherein said first mirror is an output coupler mirror.

27. The enhanced pumped laser system of claim 1, wherein at least one means are provided to cool said at least one laser medium and said at least one means for pumping said at least one laser medium.

28. The enhanced pumped laser system of claim 1, wherein said at least one laser medium is a CW pumped laser medium.

29. The enhanced pumped laser system of claim 1, wherein at least a portion of said at least one laser medium is quasi CW pumped.

30. The enhanced pumped laser system of claim 1, wherein at least a portion of said at least one laser medium is continuously pumped.

31. The enhanced pumped laser system of claim 1, wherein at least a portion of said at least one laser medium is pumped upon demand.

32. The enhanced pumped laser system of claim 1, wherein at least a portion of said pumping is done towards at least a portion of at least one end of said at least one laser medium.

33. The enhanced pumped laser system of claim 1, wherein said first mirror has at least one reflective area, and wherein said reflective area is always in synchronism with said at least one means for sweeping said allowable laser beam path.

34. The enhanced pumped laser system of claim 1, wherein at least one spinning aperture assembly defines and sweeps said at least one active region.

35. The enhanced pumped laser system of claim 1, wherein said laser beam passes through at least one aperture assembly, and wherein said at least one aperture assembly has at least one adjustable aperture.

36. The enhanced pumped laser system of claim 1, wherein said output laser beam is a trepanning laser beam.

37. The enhanced pumped laser system of claim 36, wherein at least a portion of said trepanning laser beam output is directed towards at least a portion of at least one light pipe.

38. A method for an enhanced laser system comprising the steps of:
 a) rotating at least one spinning beam steering assembly (SBSA) having an offset axis and a rotational axis, wherein said offset axis is displaced from said rotational axis by at least one radius of a laser beam,
 b) pumping at least a portion of at least one laser medium, wherein said pumping causes a population inversion in at least a portion of said at least one laser medium, and wherein at least a portion of said laser medium is lasing and forming said laser beam, while at least a portion of a non-lasing portion of said laser medium is being pumped to cause said population inversion,
 c) having at least one means for defining an allowable laser beam path, wherein said allowable laser beam path is smaller than the cross-section of said at least one laser medium,
 d) using at least two mirrors to reflect at least a portion of said laser beam, wherein at least one of said mirrors is an output coupler mirror, and
 e) allowing the passage of said reflected laser beam to pass through said at least one means for defining an allowable laser beam path, and thereby increasing said pulse repetition rate for said pumped laser.

39. The method of claim 38, wherein at least a portion of said laser medium is pumped while at least a portion of said laser medium is allowed to lase simultaneously.

40. The method of claim 38, wherein said at least one means for defining an allowable laser beam path is an aperture.

41. The method of claim 40, wherein said aperture is an integral part of at least one spinning beam steering assembly (SBSA).

42. The method of claim 40, wherein said aperture is a variable aperture.

43. The method of claim 38, wherein said at least one means for sweeping said allowable laser beam path is selected from a group comprising at least one galvanometer scanner or resonant scanner or rotating polygon scanner or electro-optic scanner or holographic scanner or acousto-optic scanner.

44. The method of claim 38, wherein said means for sweeping said allowable laser beam path is a spinning beam steering assembly (SBSA).

45. The method of claim 44, wherein said means of rotating said at least one SBSA is an electric motor or a hydraulic motor or air driven gas motor or a turbine.

46. The method of claim 44, wherein said at least one SBSA has at least one means for lubrication while said at least one SBSA is rotating.

47. The method of claim 46, wherein said lubrication to said at least one rotating SBSA is provided by at least one cooling fluid.

48. The method of claim 44, wherein said pumping is done towards at least a portion of at least one end of said at least one laser medium, and wherein said pumping laser radiation passes through at least a portion of said at least one SBSA.

49. The method of claim 44, wherein said SBSA has at least one means to re-direct at least a portion of said laser beam.

50. The method of claim 49, wherein said at least one means to re-direct at least a portion of said laser beam is at least one prism.

51. The method of claim 49, wherein said at least one means to re-direct at least a portion of said laser beam is at least one light pipe.

52. The method of claim 49, wherein said at least one means to re-direct at least a portion of said laser beam is at least two etched pockets.

53. The method of claim 49, wherein said at least one means to re-direct at least a portion of said laser beam is at least two mirrors.

54. The method of claim 49, wherein said at least one means to re-direct at least a portion of said laser beam is at least one reflective means.

55. The method of claim 49, wherein said at least one means to re-direct at least a portion of said laser beam is at least one refractive means.

56. The method of claim 38, wherein said laser medium is selected from a group comprising a solid laser medium, a liquid laser medium or a gaseous laser medium.

57. The method of claim 38, wherein said at least one means for creating said population inversion in at least a portion of said laser medium is selected from a group comprising mechanical excitation, electromagnetic radiation, electrical discharge, chemical excitation or thermal excitation.

58. The method of claim 38, wherein at least a portion of said at least one laser medium is hollow.

59. The method of claim 58, wherein at least a portion of said hollow laser medium is cooled from inside said hollow portion of said hollow laser medium or outside of said hollow laser medium or both.

60. The method of claim 58, wherein at least a portion of said hollow laser medium is pumped from inside said hollow portion of said hollow laser medium or outside of said hollow laser medium or both.

61. The method of claim 38, wherein said at least one laser medium comprises a lasing portion and a non-lasing portion, and wherein at least a portion of said non-lasing portion is pumped by said at least one means for pumping said at least one laser medium.

62. The method of claim 38, wherein at least one Q-switch controls the passage of said laser beam.

63. The method of claim 38, wherein said first mirror is an output coupler mirror.

64. The method of claim 38, wherein at least one means are provided to cool said at least one laser medium and said at least one means for pumping said at least one laser medium.

65. The method of claim 38, wherein said at least one laser medium is a CW pumped laser medium.

66. The method of claim 38, wherein at least a portion of said at least one laser medium is quasi CW pumped.

67. The method of claim 38, wherein at least a portion of said at least one laser medium is continuously pumped.

68. The method of claim 38, wherein at least a portion of said at least one laser medium is pumped upon demand.

69. The method of claim 38, wherein at least a portion of said pumping is done towards at least a portion of at least one end of said at least one laser medium.

70. The method of claim 38, wherein said first mirror has at least one reflective area, and wherein said reflective area is always in synchronism with said at least one means for sweeping said allowable laser beam path.

71. The method of claim 38, wherein at least one spinning aperture assembly defines and sweeps said at least one active region.

72. The method of claim 38, wherein said laser beam passes through at least one aperture assembly, and wherein said at least one aperture assembly has at least one adjustable aperture.

73. The method of claim 38, wherein said output laser beam is a trepanning laser beam.

74. The method of claim 73, wherein at least a portion of said trepanning laser beam output is directed towards at least a portion of at least one light pipe.

* * * * *